No. 659,753. Patented Oct. 16, 1900.
W. A. MILLER.
DRAG SAW.
(Application filed July 21, 1900.)

(No Model.) 4 Sheets—Sheet 1.

Witnesses Inventor
William A. Miller.
By R.S.&A.B.Lacey, Attorneys

No. 659,753.  
W. A. MILLER.  
DRAG SAW.  
(Application filed July 21, 1900.)  
(No Model.) 4 Sheets—Sheet 2.

Patented Oct. 16, 1900.

Inventor  
William A. Miller.

Witnesses  
By R. H. A. B. Lacey, Attorneys

No. 659,753. Patented Oct. 16, 1900.
W. A. MILLER.
DRAG SAW.
(Application filed July 21, 1900.)
(No Model.) 4 Sheets—Sheet 3.
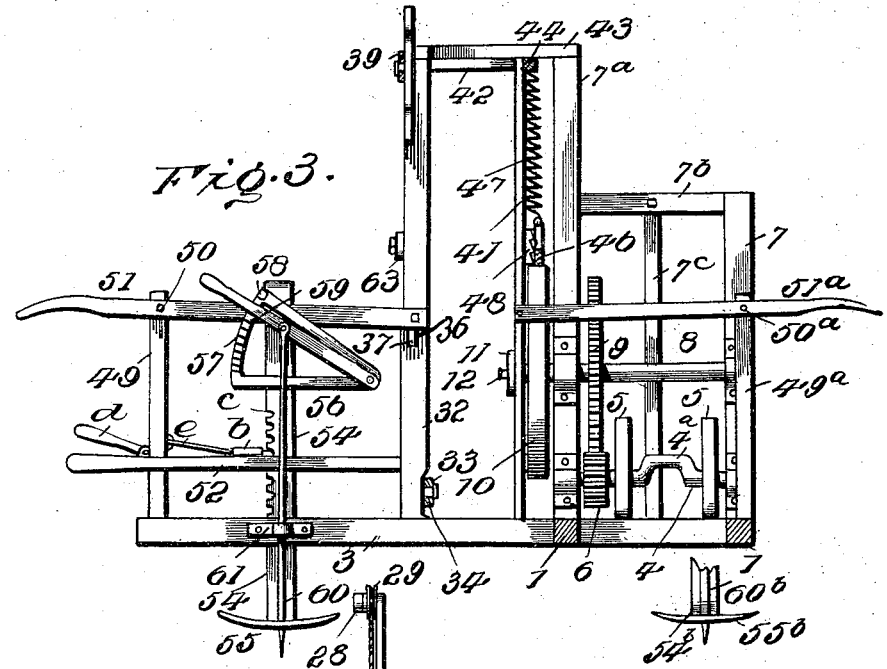
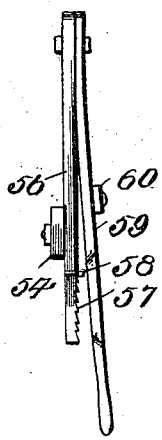
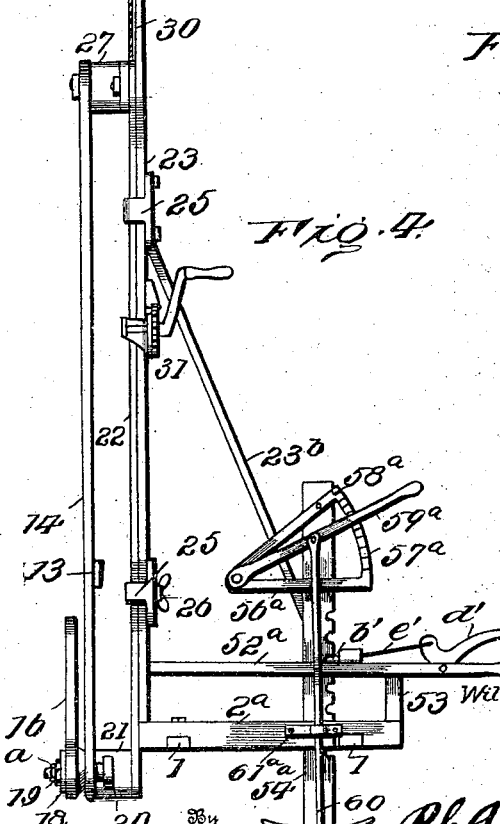

No. 659,753. Patented Oct. 16, 1900.
W. A. MILLER.
DRAG SAW.
(Application filed July 21, 1900.)
(No Model.) 4 Sheets—Sheet 4.
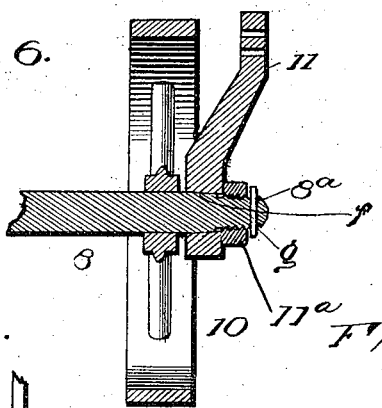
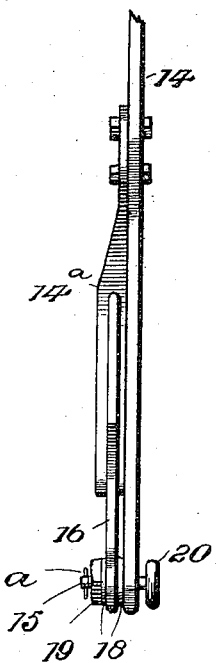
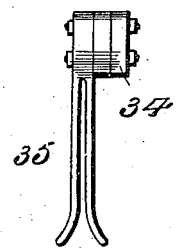
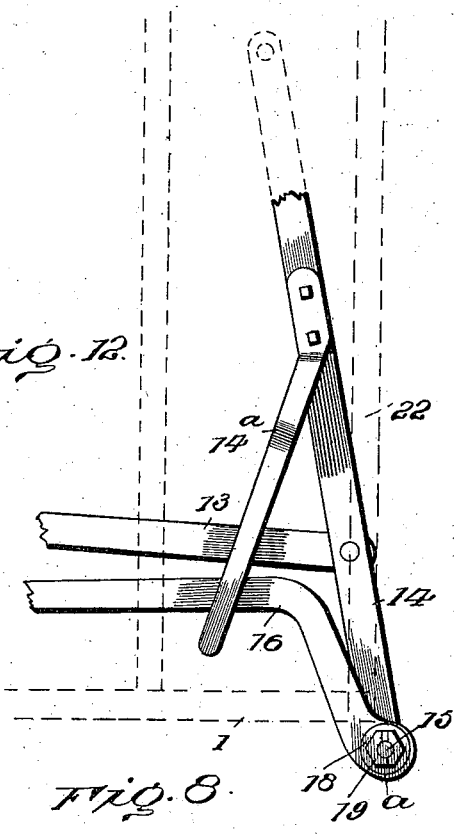
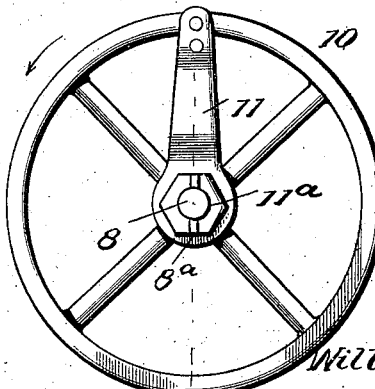
Witnesses
Inventor
William A. Miller
By R. H. B. Lacey, Attorneys
THE NORRIS PETERS CO., PHOTO-LITHO., WASHINGTON, D. C.

UNITED STATES PATENT OFFICE.

WILLIAM A. MILLER, OF WAPINITIA, OREGON.

DRAG-SAW.

SPECIFICATION forming part of Letters Patent No. 659,753, dated October 16, 1900.

Application filed July 21, 1900. Serial No. 24,429. (No model.)

*To all whom it may concern:*

Be it known that I, WILLIAM A. MILLER, a citizen of the United States, residing at Wapinitia, in the county of Wasco and State of Oregon, have invented certain new and useful Improvements in Drag-Saws; and I do hereby declare the following to be a full, clear, and exact description of the invention, such as will enable others skilled in the art to which it appertains to make and use the same.

This machine is capable of all the uses of appliances of this type and is adapted to be operated by any approved and selected motive power either mounted upon the same frame with the working parts or independent thereof and connected in any convenient way with the drive-shaft. The motive power may be derived from any style and type of engine actuated by steam, electricity, gas, water, air, volatile liquid, or any motive agent. Inasmuch as the engine and the manner of connecting it with the machine form no vital part of the invention and depend upon location and special advantages, they are not shown in the present drawings.

For a full description of the invention and the merits thereof and also to acquire a knowledge of the details of construction of the means for effecting the result reference is to be had to the appended description and drawings hereto attached.

While the essential and characteristic features of the invention are necessarily susceptible of modification, still the preferred embodiment of the invention is illustrated in the accompanying drawings, in which—

Figure 1:
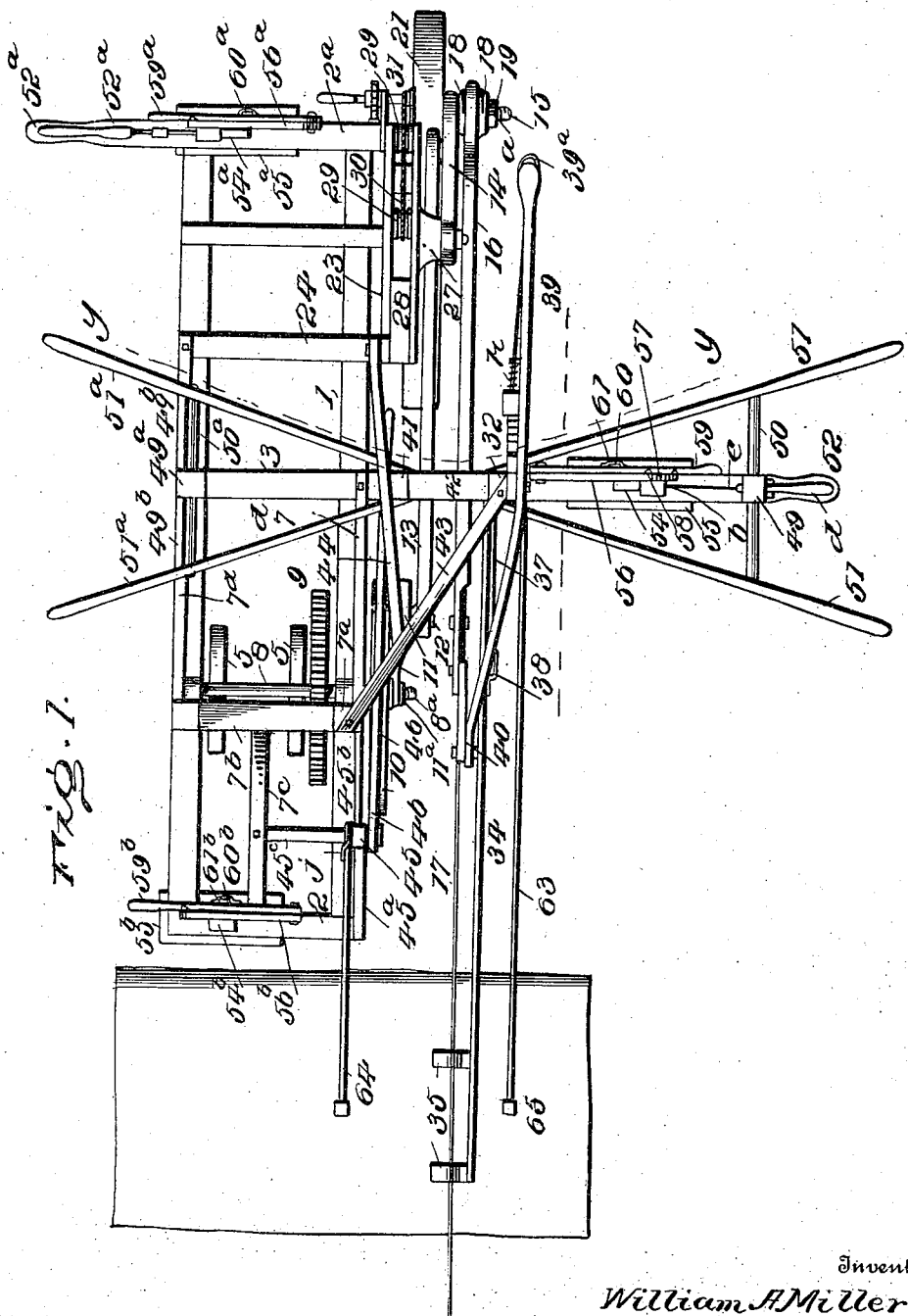
Figure 2:
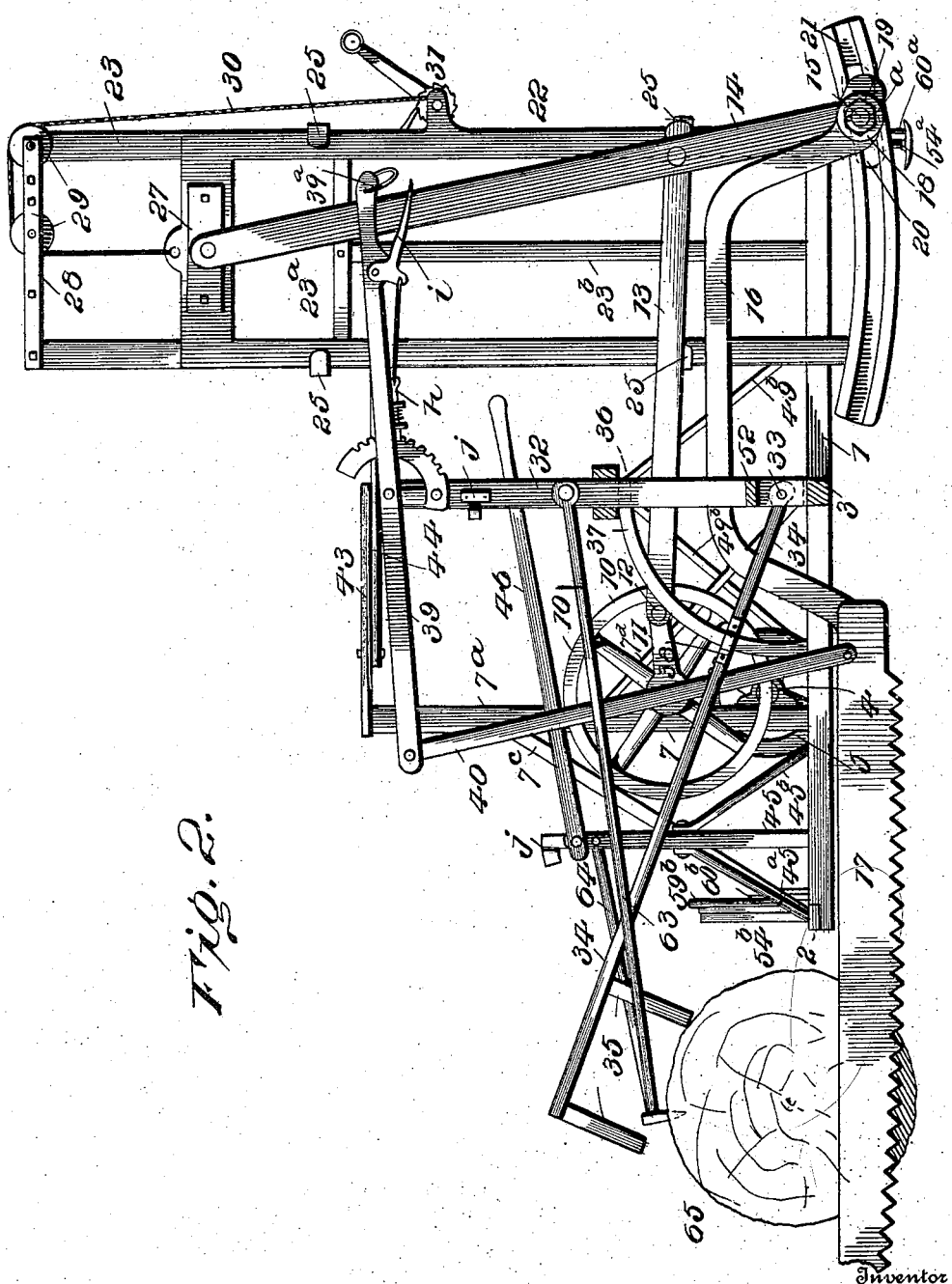

Figure 1 is a top plan view. Fig. 2 is a side elevation. Fig. 3 is a section about on the line Y Y of Fig. 1 looking toward the front. Fig. 4 is a rear view, the curved guide being in section and the parts in front of the line Y Y, Fig. 1, being omitted. Fig. 5 is a detail view of the fly-wheel and crank-arm. Fig. 6 is a sectional view on the line $p\ p$ of Fig. 5. Fig. 7 is a top plan view of a foot. Fig. 8 is a section on the line $n\ n$ of Fig. 7. Fig. 9 is a front view of the saw-guide. Fig. 10 is a top plan view of the mechanism for operating and holding the anchor-pin to its work. Fig. 11 is a detail view in elevation of an anchor-pin. Fig. 12 is a side view showing different means for guiding the saw-arm. Fig. 13 is an edge view of the parts shown in Fig. 12.

Corresponding and like parts are referred to in the following description and indicated in all the views of the drawings by the same reference characters.

Two parallel horizontal longitudinal sills 1 are connected at their ends by transverse sills 2 and $2^a$. Also a transverse horizontal sill 3 is secured to the central parts of the sills 1 and extends beyond the base at one side. To these sills the posts and other parts of the frame and machine are connected in any suitable and substantial manner.

A double crank-shaft 4, provided with two small fly-wheels 5 and a pinion 6, is secured by bearings to the posts 7 and $7^a$. A counter-shaft 8, carrying a gear-wheel 9 in mesh with the pinion 6, is secured by bearings to the posts 7 and $7^a$ and is provided at one end with a fly-wheel 10 and a crank-arm 11. The crank-arm 11 carries a crank-pin 12, to which is connected a pitman 13, attached at its rear end to the swinging bar 14, having a perforation near its lower end in which a bolt 15 is rigidly secured and which provides a pivotal bearing for the inner end of the arched or bracket-shaped saw-arm 16, to the forward end of which the saw 17 is fastened by bolts. Washers 18 are placed on each side of the pivoted end of the saw-arm 16, and a nut 19 is fitted on the threaded end of the bolt. A pin $a$ is fitted in an opening formed in the threaded end of the bolt 15 and bears against the nut 19. Thin washers may be placed on said bolt 15 from time to time to take up lateral wear.

The swinging bar 14 is connected with a slide 20 by means of the bolt 15. When in operation, the slide 20 is adapted to travel back and forth in a curved guideway or track 21, formed with flanges which overlap the side edges of said guide. The guideway 21 is secured to the lower end of a vertically-adjustable or sliding frame 22, held in contact with a vertical stationary frame 23, rising from the rear end of the base-frame and attached to one end of the transverse timbers $2^a$ and 24. It will be observed that the timbers $2^a$ and 24 project far enough from the adjacent sill 1 to support the frame 23 in proper relative position. Preferably both the adjustable frame 22 and stationary frame 23 are made of metal.

Four open keepers or clasps 25 are secured to the rearward sides of the uprights of the stationary frame 23 and are so formed as to embrace the edges and sides of the uprights of the adjustable frame 22, whereby the movable frame is held closely to the stationary frame. Thumb-screws 26 are inserted through threaded holes in the bases of the two lower keepers 25 and through the uprights of the stationary frame, so that when turned inwardly their ends will press against the uprights of the frame 22 and hold it firmly at any height to which it may have been adjusted.

A block 27 is secured to the outer side of the upper cross-bar of the frame 22, and the upper end of the swinging bar 14 is pivotally attached thereto.

On the outer side of the upper end of the stationary frame 23 a horizontal bar 28 is secured in such a manner as to provide two openings, in which two pulleys 29 are placed. One end of a rope 30 being secured to the center of the upper end of adjustable frame 22 passes upward and over said pulleys, thence downward to a windlass 31, provided with a ratchet and pawl, as usual, and it and its adjuncts are supported by a suitably-formed casting riveted or bolted to the adjoining stationary upright.

It will be observed that if the fly-wheel 10 remains stationary while the frame 22 is being adjusted from its highest to its lowest point, or vice versa, the lower end of the swinging bar 14 will vary in distance from the transverse sill 3 at the different points of adjustment of the said frame. Therefore the recessed or upwardly-receding part of the saw-arm 16, also the guideway 21, should be made long enough to provide for this variation. Preferably the longitudinal center of the guideway 21 is nearer the rear end of the machine than the pivot at the upper end of the swinging bar 14. This feature tends toward preventing the point of the saw from striking the ground when finishing a cut.

A vertical post 32 is secured to the transverse sill 3 adjacent to the outer side of the saw-arm 16. Near the lower end of this post a pin 33 projects inward and serves as a pivotal bearing for the saw-guide bar 34, provided at its front or outer end with two saw-guides 35, spaced a suitable distance apart. These guides straddle the back of the saw in the well-known manner, and their lower ends flare or curve outwardly, as shown most clearly in Fig. 9. The post 32 is provided with a mortise 36, in which the upper end of a curved guide-bar 37 is rigidly secured, said guide-bar passing through a keeper 38, provided on the saw-guide bar 34, whereby said saw-guide bar is kept in line with its work. A lifting-lever 39 is pivotally connected to the upper end of the post 32, and its front end is pivotally attached to the upper end of a bar 40, having connection at its lower end with the saw-arm or back of the saw. The forward portion of the lifting-lever 39 in advance of the post 32 is deflected inwardly to about the plane of the saw 17 and bar 40.

A vertical post 41 is secured to the transverse sill 3 a short distance inside of the post 32, and a cross-piece 42 connects the upper ends of the posts 32 and 41. A diagonal brace-tie 43 connects the upper ends of the posts 32 and 7$^a$, and another brace-tie 44 connects stationary frame 23 to the upper end of the post 41 and to the brace-tie 43. A post 45 is secured to the front end portion of the sill adjacent to the saw, and a brake 46 is pivotally attached thereto and consists of a bar arranged to bear on the fly-wheel 10. The upper end of the coiled spring 47 is secured to the brace-tie 44 adjacent to the post 41, its lower end being attached to the brake 46, said spring normally holding the brake from contact with the fly-wheel. A toothed plate 48 is attached to the post 41 and coöperates with the brake 46 to hold it in contact with the fly-wheel 10 when required to retard or check its speed.

A vertical post 49 is secured to the outer end of the transverse sill 3, and a similar post 49$^a$ is secured to the opposite end of the said sill, the posts being mortised at their upper ends to receive bars 50 and 50$^a$, made fast therein, and which provide supports for two pairs of handles 51 and 51$^a$, having their inner ends secured, respectively, to the posts 32 and 41. A beam 52, situated above and parallel with the projecting portion of the transverse sill 3, is secured to posts 32 and 49 and extends far enough beyond the post 49 to provide a handhold for lifting purposes. A similar beam 52$^a$ is relatively situated and secured for like purposes above the transverse sill 2$^a$ at the rear end of the machine. To provide for this connection, the sill 2$^a$ projects beyond the right-hand longitudinal sill, and a short post 53 is secured to its outer end and joins it to the beam 52$^a$ above the inner end of said beam 52$^a$, being secured to the upright of the stationary frame 23.

A vertically-adjustable leg 54 passes through vertically-alined openings provided in the sill 3 and beam 52, the same being held in an adjusted position by a spring-actuated detent $b$, which engages one of the series of notches $c$ formed in the edge of the leg 54. Either the lever $d$ or rod $e$, which operates said detent, may pass through an opening provided in the post 49. The lower end of this leg is provided with a foot 55, of which a preferred form is shown in Figs. 7 and 8. Preferably both of its ends, front and rear, curve upward, whereby it is adapted to slide as a runner in either direction. The foot is secured to the leg by passing bolts or rivets through the holes in its eye, which register with holes in the lower end of the leg. It is desirable to have these feet of sufficient width and length to provide an effective bearing on soft or muddy ground.

A triangular frame 56 is secured to the upper part of the adjustable leg 54, its curved side being provided with teeth 57 and an offset or shoulder 58 near its upper end, said teeth and offset projecting laterally beyond the plane of the frame. A spring-metal lever 59 is pivotally secured at the inner angle of said frame 56, and the upper end of an anchor-pin 60 is pivotally connected thereto and passes downward through a keeper 61, secured to transverse sill 3, its lower pointed end being adapted to enter the ground through a hole 62, provided in the foot 55. The lower part of the anchor-pin, which passes through the hole in the foot and enters the ground, is preferably round and tapers to a point. The lever 59 is adapted to engage with any one of the teeth 57 to hold the point of the anchor-pin projected to a greater or less degree, and when engaged with the offset 58 the point is withdrawn beyond the lower face of the shoe 55, thereby permitting it to ride over the ground. A second vertically-adjustable leg $54^a$ is provided to support the rear end of the machine and is supplied with similar attachments and adjuncts, whereby it can be operated in same manner and for like purposes as the leg 54. Another leg $54^b$ is located at the front end of the frame and is provided with a series of holes, which register with transverse holes in the sill, whereby by means of a pin or bolt it can be adjusted to support the front end of the machine at any desired height.

The anchoring-pins and adjuncts coöperating with the respective legs $54^a$ and $54^b$ are precisely the same as like parts applied to the leg 54, and corresponding parts are indicated by the exponents "a," "b," "prime," and the like applied to like numerals and letters.

The inner end of the long dog 63 is pivotally connected to the post 32, and the short dog 64 is connected in the same manner to the post 45. The end $f$ of shaft 8 entering the hub of crank-arm 11 is made tapering, and the opening in the hub of crank-arm is bored with a corresponding taper. The outer end of shaft beyond the tapered part $f$ is threaded and receives a nut $11^a$, which when tightened bears against the hub of crank-arm and forces it upon the tapered end $f$ of the shaft and holds it firmly in position. The threaded end of the shaft is provided with a hole $g$ to receive a pin $8^a$, which will be sufficiently far from the nut to admit of the latter being unscrewed a distance to loosen the crank-arm when required. To tighten the crank-arm 11, the nut $11^a$ is turned in the same direction in which the fly-wheel revolves, which is indicated by the arrows in Fig. 5. When the machine is in operation, if the saw-wheel be suddenly pinched or stopped by any accident the momentum of the fly-wheels will cause the shaft to turn in the hub of the crank-arm, thereby loosening the nut $11^a$, thus permitting the motive power to continue in action without injuring any part of the machine.

Posts 7 and $7^a$ are connected by a cross-tie $7^b$, which in turn may be connected with transverse sill 2 by a diagonal brace $7^c$. Said posts may also be supported on opposite sides by two diagonal braces $7^d$. Post 45 may be supported by three braces $45^a$, $45^b$, and $45^c$, the latter connecting it to brace $7^c$. Post $49^a$ may be supported by two braces $49^b$, one of which crosses the rearward brace of the pair $7^d$, into which it may be jointed. The cross-bar $23^a$ of stationary frame may be connected by a brace $23^b$ to the right-hand longitudinal sill 1, as shown. The system of braces just referred to is only suggestive, and it may be altered, so as to better adapt it to light or heavy machinery or to the different styles or kinds of motors which may be used.

The machine is operated by having the motive power applied to the crank-shaft $4^a$, the saw being anchored high enough to clear the log and is moved into position to make a cut. If necessary, the legs 54 and $54^a$, or either of them, are adjusted so as to bring the saw in line with the desired direction of cut. Then the anchor-pins are forced into the ground and the pointed ends of the dogs driven into the log 65. If required, the frame 22 is adjusted. Next open the detent-latch $h$ and secure its lever $i$ in the link $39^a$, so as to hold it open. Now by means of the lifting-lever 39 ease the saw down onto the log and the sawing begins. Just before the cut is completed take hold of the lifting-lever 39, and as soon as finished raise the saw into the guides far enough above the log to clear it and lock the detent-latch $h$. Then raise the dogs 64 and secure them in spring-hooks $j$ or other suitable devices provided at or near the top of the posts 32 and 45, withdraw the anchor-pins from the ground, and move the machine to position to make the next cut, and proceed as before. It is not necessary to stop the machinery while the machine is being moved from cut to cut, as, if necessary, its speed can be regulated by pressure of brake on fly-wheel, and the guides will hold the saw. If any power should be employed which can be more satisfactorily controlled by other means, the brake need not be used for that purpose.

Preferably the saw used with this machine is made as short as may be practicable, and the points of the last two teeth at the point end thereof are rounded off so as to prevent them from cutting and to make them a little shorter (say about one-sixteenth of an inch) than the adjoining teeth, whereby they will be adapted to rub against the sides of the kerf whenever the point of the saw comes within the limits of the same, thus serving as guides for said saw-point.

Figs. 12 and 13 show a downwardly-projecting bifurcated guide-bar $14^a$, secured to the swinging bar 14, its prongs reaching down beyond the saw-arm 16, whereby said saw-arm is kept from deviating by the machine leaning toward either side. It is obvious that this guide-bar will tend toward keeping the saw at all times in line with the desired direction of cut, be it vertical or otherwise.

The following is a statement of some of the advantages illustrated, i. e.: ease and convenience of adjustments to adapt the machine to uneven or sloping ground or hillsides and range of adjustment to avoid obstructions—such as stumps, roots, stones, and the like. It will be observed that the legs may be so adjusted as to permit the machine to pass over or to work in many places where an ordinary machine would be useless. The relative position of the recessed or upwardly-projected part of the saw-arm to the transverse central sill brings the cutting edge of the saw parallel with the ground, or nearly so, when finishing a cut. Therefore even if the log be lying on the ground this arrangement tends toward preventing the point of the saw from being jabbed into the ground, be the adjustment of the other as they may. Having a pair of handles attached in both front and rear facilitates the moving of the machine alongside of a log in either direction, and if it be built too heavy for one man two can be employed to handle it. The machine can be anchored at different distances from a log, if necessary, to avoid obstructions. To meet this requirement, the saw guide-bar is provided with two saw-guides 35, as shown; also, the downwardly-projecting points of the dogs should be made a little longer and stronger than they otherwise would be. In this connection it may be noted that it is not essential that the points of the dogs be driven into the extreme top of the log nor that the saw-guides should rest on its highest part; also, preferably, the space between the two saw-guides 35 is left open, as shown, so as to admit of a wedge or wedges being driven into the kerf, which is sometimes necessary in order to prevent it from closing, and thereby pinching the saw. By means of the curved arm 37, which guides the saw-guide bar 34 and prevents it from being deflected to either side, the saw is caused to start the kerf in line with its operative parts, and thereby kept from binding as the cut deepens. The lower end of the swinging bar 14 is held more securely in line with its work than usual. This is accomplished by placing the side faces of both adjustable sash 22 and guideway 21 parallel with the line of travel of said swinging bar. This feature, especially when considered in conjunction with the office of the curved guide-bar 37, is of decided advantage in a drag-saw machine, which will be moved from place to place while at work in the woods, and consequently will seldom stand plumb or be used on level ground. The regulation of speed is effected by means of a fly-wheel brake 46 while the machine is being moved from cut to cut; also, said brake may be sometimes used to advantage in case of accident. The safety-crank arm 11 tends toward preventing damage to machinery, as already explained.

Having thus described the invention, what is claimed as new is—

1. In a drag-saw, a fixed frame, a vertically-movable frame, means for adjusting the movable frame vertically and holding it in an adjusted position, a longitudinally-curved guideway horizontally disposed at the lower end of the movable frame, a swinging bar fulcrumed at its upper end to the top part of the movable frame, a saw, means for raising and lowering the saw independent of the movable frame, and attached to the fixed frame, a connection between the saw and the aforesaid guideway and directed in its movements thereby and having the lower end of the swinging bar connected therewith, and means for imparting an oscillatory movement to the said swinging bar, substantially as described.

2. In a drag-saw, a fixed frame, driving mechanism applied thereto, a vertically-movable frame, means for adjusting the frame vertically and holding it in an adjusted position, a curved guideway arranged horizontally at the lower end of the said movable frame and adjustable therewith, a saw, means for raising and lowering the saw and adapted to hold it at any desired elevation, a swinging bar fulcrumed to the upper end of the movable frame, an arm attached to the saw, means connecting the arm and lower end of the swinging bar and directed in its movements by the aforementioned guideway, and a connection between the driving mechanism and the swinging bar, substantially as specified.

3. In a drag-saw, a fixed frame, a movable frame mounted for vertical adjustment, a curved guideway attached to the said movable frame, a saw, an arm secured to the saw and directed in its reciprocating movements by the said curved guideway, a swinging bar fulcrumed to the movable frame and having connection with the arm of the saw, driving mechanism mounted upon the fixed frame, and a connecting-bar between the driving mechanism and the swinging bar, substantially as specified.

4. In a drag-saw, a frame projected vertically from the base portion of the main framework, a vertically-movable frame, means between the two frames for adjusting the movable frame to the required elevation, clips for connecting the two frames and provided with clamping means for securing the movable frame in an adjusted position, a swinging bar fulcrumed to the movable frame, a saw having connection with the swinging bar to be reciprocated thereby, and actuating mechanism for imparting a movement to the swinging bar, substantially as specified.

5. In a drag-saw, a curved guide, a swinging bar, a saw, an arm attached at one end to the saw, means for connecting the opposite end of the arm to the swinging bar and fitted to the said guideway to be directed in its movements thereby, driving mechanism including the crank-arm, and a pitman connection between said crank-arm and the swinging bar, as and for the purpose set forth.

6. In a drag-saw, a vertically-movable frame provided with a curved guide, a saw, an arm attached at one end to the saw, a swinging bar, means connecting the swinging bar with the arm of the saw and directed in its movements by the aforesaid curved guideway, driving mechanism including a crank-arm, and a pitman connection between said crank-arm and the swinging bar, substantially as set forth.

7. In combination, a vertically-disposed fixed frame, a vertically-movable frame, clips connecting the two frames, clamping means applied to certain of the clips for securing the movable frame in an adjusted position, a swinging bar fulcrumed to the movable frame, a saw having an arm extension connected with the swinging bar, a guideway for the connected end portion of the saw-arm and swinging bar and attached to the movable frame, means for raising and lowering the saw, and actuating mechanism for imparting an oscillatory movement to the swinging bar, substantially as specified.

8. In a drag-saw, and in combination with the saw-blade, actuating mechanism therefor, and means for raising and lowering the saw-blade, a pivoted bar, and guides applied to the outer end portion of the pivoted bar and spaced apart, each guide being slotted and having the free end portions bordering upon the slot oppositely deflected, as and for the purpose set forth.

9. In a drag-saw, and in combination with the frame comprising a transverse sill and vertical posts, actuating mechanism mounted on the frame, a saw, and connections between said saw and the actuating mechanism, bars disposed lengthwise of the machine and secured to the outermost vertical posts, and pairs of handles secured at their inner ends to the innermost vertical posts and intermediate of their ends to the extremities of the said bars, substantially as set forth.

10. In a drag-saw, and in combination with the saw-blade, and actuating mechanism therefor including a shaft having a tapering portion, a crank-arm mounted upon the tapering portion of the said shaft and caused to revolve therewith by frictional engagement, and connecting means between said crank-arm and the saw, as and for the purpose set forth.

11. In a drag-saw, and in combination with the saw-blade, and actuating mechanism therefor including a shaft having a tapering portion, a crank-arm mounted upon the tapering portion of the shaft, a clamp-nut threaded upon the said shaft and adapted to bear against the crank-arm and cause it to engage frictionally with the shaft so as to rotate therewith, and means connecting the crank-arm with the said saw, substantially as specified.

12. In a drag-saw, and in combination with the saw-blade, and actuating mechanism therefor including a shaft having a tapering portion, a crank-arm mounted upon the tapering portion of the shaft and operatively connected with the saw-blade, a clamp-nut threaded upon the said shaft and adapted to force the crank-arm upon the tapering portion thereof, and a stop applied to the said shaft a short distance from the nut to admit of the latter having a limited play whereby the crank-arm is automatically loosened in the event of the saw being subjected to abnormal strain, substantially as set forth.

13. In combination with the frame of a drag-saw bearing the saw-blade and actuating mechanism, vertically-adjustable standards provided with feet, anchoring-pins carried by said standards, and means for operating the anchoring-pins, as and for the purpose set forth.

14. In a drag-saw, and in combination with the frame bearing the saw-blade and actuating mechanism therefor, vertically-adjustable standards provided with feet, anchoring-pins adapted to operate through openings provided in the said feet, and operating means for the said anchoring-pins, substantially as set forth.

15. In a drag-saw, and in combination with the frame bearing the saw-blade, and actuating mechanism, vertically-adjustable standards provided with feet, anchoring-pins adapted to operate through openings provided in the said feet, levers fulcrumed to the said standards and having connection with the anchoring-pins for operating the latter, and means for securing said levers in an adjusted position and carried by the respective standards, substantially as set forth.

In testimony whereof I affix my signature in presence of two witnesses.

WILLIAM A. MILLER. [L. S.]

Witnesses:
S. E. DAVIS,
L. M. WOODSIDE.